(12) United States Patent
James

(10) Patent No.: US 11,350,270 B2
(45) Date of Patent: May 31, 2022

(54) METHOD, SOFTWARE, APPARATUS, ELECTRONIC DEVICE, SERVER AND STORAGE MEDIUM FOR ENSURING PRIVACY OF COMMUNICATION

(71) Applicant: SARONIKOS TRADING AND SERVICES, UNIPESSOAL LDA, Funchal/Madeira (PT)

(72) Inventor: Robert James, Hatfield (GB)

(73) Assignee: Saronikos Trading and Services, Unipessoal LDA, Funchal/Madeira (PT)

( * ) Notice: Subject to any disclaimer, the term of this patent is extended or adjusted under 35 U.S.C. 154(b) by 0 days.

(21) Appl. No.: 16/312,104

(22) PCT Filed: Jun. 22, 2016

(86) PCT No.: PCT/EP2016/064394
§ 371 (c)(1),
(2) Date: Dec. 20, 2018

(87) PCT Pub. No.: WO2017/220136
PCT Pub. Date: Dec. 28, 2017

(65) Prior Publication Data
US 2019/0166489 A1 May 30, 2019

(51) Int. Cl.
*H04W 12/02* (2009.01)
*G06F 21/62* (2013.01)
*H04L 51/04* (2022.01)
(Continued)

(52) U.S. Cl.
CPC .......... *H04W 12/02* (2013.01); *G06F 21/604* (2013.01); *G06F 21/6245* (2013.01);
(Continued)

(58) Field of Classification Search
CPC .... G06F 3/0483; G06F 3/04883; G06F 21/31; G06F 21/32; G06F 21/61; G06F 21/6218;
(Continued)

(56) References Cited

U.S. PATENT DOCUMENTS 8,359,659 B2\* 1/2013 Sim ..................... G06F 21/6245
726/34
8,417,953 B2\* 4/2013 Schroter ............. G06F 21/6218
713/172
(Continued)

OTHER PUBLICATIONS

International Search Report and Written Opinion dated Feb. 27, 2017, issued in PCT Application No. PCT/EP2016/064394, filed Jun. 22, 2016.

*Primary Examiner* — Magdi Elhag
(74) *Attorney, Agent, or Firm* — Workman Nydegger

(57) ABSTRACT

An apparatus and a method for preserving the privacy of at least a user, wherein the method includes an authentication phase during which authentication information specifying a first level of access and a second level of access are detected, a determination phase during which it is determined, on the basis of the authentication information, whether the first or the second level of access is enabled, a first output phase during which at least one first set of personal information (P1) is outputted, through the output apparatus, if either the first level of access or the second level of access is enabled, and a second output phase during which at least one second set of personal information (P2) is outputted, through the output apparatus, only if the second level of access is enabled.

13 Claims, 6 Drawing Sheets

(51) Int. Cl.
  *H04L 29/06* (2006.01)
  *H04W 12/06* (2021.01)
  *H04W 12/08* (2021.01)
  *H04W 12/033* (2021.01)
  *G06F 21/60* (2013.01)

(52) U.S. Cl.
  CPC ............ H04L 51/04 (2013.01); H04L 63/105 (2013.01); H04W 12/033 (2021.01); H04W 12/06 (2013.01); H04W 12/08 (2013.01)

(58) Field of Classification Search
  CPC ............. G06F 21/6245; H04L 63/0861; H04L 63/105; H04L 51/04; H04W 12/0013; H04W 12/02; H04W 12/06; H04W 12/08
  See application file for complete search history.

(56) References Cited

U.S. PATENT DOCUMENTS

| | | | | |
|---|---|---|---|---|
| 9,060,681 | B2* | 6/2015 | Tice | A61B 5/024 |
| 9,117,088 | B2* | 8/2015 | Faaborg | G06F 21/604 |
| 9,286,482 | B1* | 3/2016 | Dumont | G06F 21/32 |
| 9,532,212 | B2* | 12/2016 | Huang | H04M 1/67 |
| 9,721,107 | B2* | 8/2017 | Han | G06F 21/32 |
| 9,916,816 | B2* | 3/2018 | Zhu | H04L 51/24 |
| 9,934,239 | B2* | 4/2018 | Gkoulalas-Divanis | G06F 16/176 |
| 10,146,957 | B1* | 12/2018 | Duhaime | H04L 9/0625 |
| 10,516,674 | B2* | 12/2019 | Sayed | G06F 21/6245 |
| 10,698,743 | B2* | 6/2020 | Studnicka | G06Q 20/223 |
| 2006/0053285 | A1* | 3/2006 | Kimmel | H04L 9/3247 713/166 |
| 2006/0116142 | A1* | 6/2006 | Cotta | H04L 51/24 455/466 |
| 2006/0224887 | A1* | 10/2006 | Vesikivi | G06F 21/6245 713/166 |
| 2010/0205667 | A1 | 8/2010 | Anderson et al. | |
| 2012/0054838 | A1* | 3/2012 | Kim | H04W 12/08 726/4 |
| 2012/0131471 | A1 | 5/2012 | Terlouw et al. | |
| 2013/0031619 | A1* | 1/2013 | Waltermann | G06F 21/305 726/8 |
| 2014/0366123 | A1* | 12/2014 | DiBona | G06F 21/6218 726/16 |
| 2014/0366158 | A1* | 12/2014 | Han | G06F 21/60 726/28 |
| 2015/0156171 | A1 | 6/2015 | Biswas et al. | |
| 2015/0200922 | A1 | 7/2015 | Eschbach et al. | |
| 2016/0192324 | A1* | 6/2016 | Zhang | G06F 21/6245 455/458 |
| 2016/0227010 | A1* | 8/2016 | Jung | G06F 3/14 |
| 2016/0253458 | A1* | 9/2016 | Balwani | G06F 21/31 705/2 |
| 2017/0177844 | A1* | 6/2017 | Da Luz | G06F 21/45 |

* cited by examiner

METHOD, SOFTWARE, APPARATUS, ELECTRONIC DEVICE, SERVER AND STORAGE MEDIUM FOR ENSURING PRIVACY OF COMMUNICATION

In its most general aspect, the present invention relates to a method, an apparatus such as electronic devices, a server, and an storage medium for preserving the privacy of at least a user, in particular preserving the privacy related to different types of communication of said user, when the apparatus is handled by several distinct users (e.g. relatives, spouses, life partner, colleagues or the like), so that in particular embarrassing situations may be prevented. It is to be noted that the terms "apparatus" and "electronic device" are synonymous, in the description and the claims of the present application.

A massive deployment of communication devices and communication services is in progress by using a variety of different electronic devices and different communication platforms, substantially all over the world. At the same time the provision of effective measures to ensure privacy of communication parties are lagging behind.

Communication services according to the state of the art provide the possibility to allow or to reject an access to a service. The allowance of the access to the service means to obtain the possibility to have the total access to all of the possibilities provided by the service and also to the communications between the user of the communication device and any other party in the past and at the actual accessing time window. This adopts the principle of all or nothing, which affects the privacy of users and communication parties dramatically. In fact, it is common that some hidden aspects of the user's life are discovered by looking at the personal data stored in his/her own personal device (e.g. a smartphone, a tablet, or the like). This happens because the personal devices according to the state of the art have a single level of access for accessing to the personal information stored into said device, namely each device usually requires the authentication of the user after it has been switched on, e.g. through the specification of a Personal Identification Code (PIN), a password, or the like. Therefore, after a login process, the personal information (e.g. web sites preferences, home banking applications, text messages like email, SMS, MMS, or the like) contained in a personal device remains accessible to anybody having access to said device.

The present invention aims to improving present day communication services and electronic devices of communication parties and communication providers of such communication services by providing a method, an electronic device, a server and a storage medium. For this purpose the method in accordance with the invention is characterized as defined in claim 1 and the subsequent method claims. The software product, the server, the electronic device and the storage medium are defined in accordance of subsequent claims. Preferred embodiments of the invention-related method are defined by the dependent claims as stated. It is to be noted that the terms "apparatus" and "electronic device" are synonymous, in the description and the claims of the present application.

The present invention is based on the recognition that communication services for communication parties lack the provision of further levels for the allowance or rejection of access to ensure the privacy of communication parties. The present invention is based in addition on the recognition of the problem that communication services after a login process or communication apps on electronic devices remain accessible for anybody with an access to the electronic device.

Further the present invention aims to provide an apparatus and a method for preserving the privacy of at least a user. One of the aspects of the present invention is based on detecting at least two distinct levels of access through authentication means (such as programs for password identification, fingerprints sensors, or the like), so that it is possible to determine, on the basis of the level of access enabled, which sets of personal information and/or communications should be accessed by output means (e.g. display, audio adapter, or the like). In this way, it is possible to preserve the privacy of a user when the access to at least one of said set of personal information is restricted.

Further advantageous features of the present invention are the subject of the attached claims.

The features of the invention are specifically set forth in the claims annexed to this description; further features are also subject of the above and following descriptions. The corresponding characteristics will be clearer from the following description of preferred and non-exclusive embodiments shown in annexed drawings, wherein:

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for the sake of simplicity, and do not limit the protection scope or extension of the various embodiments.

Figure 1:
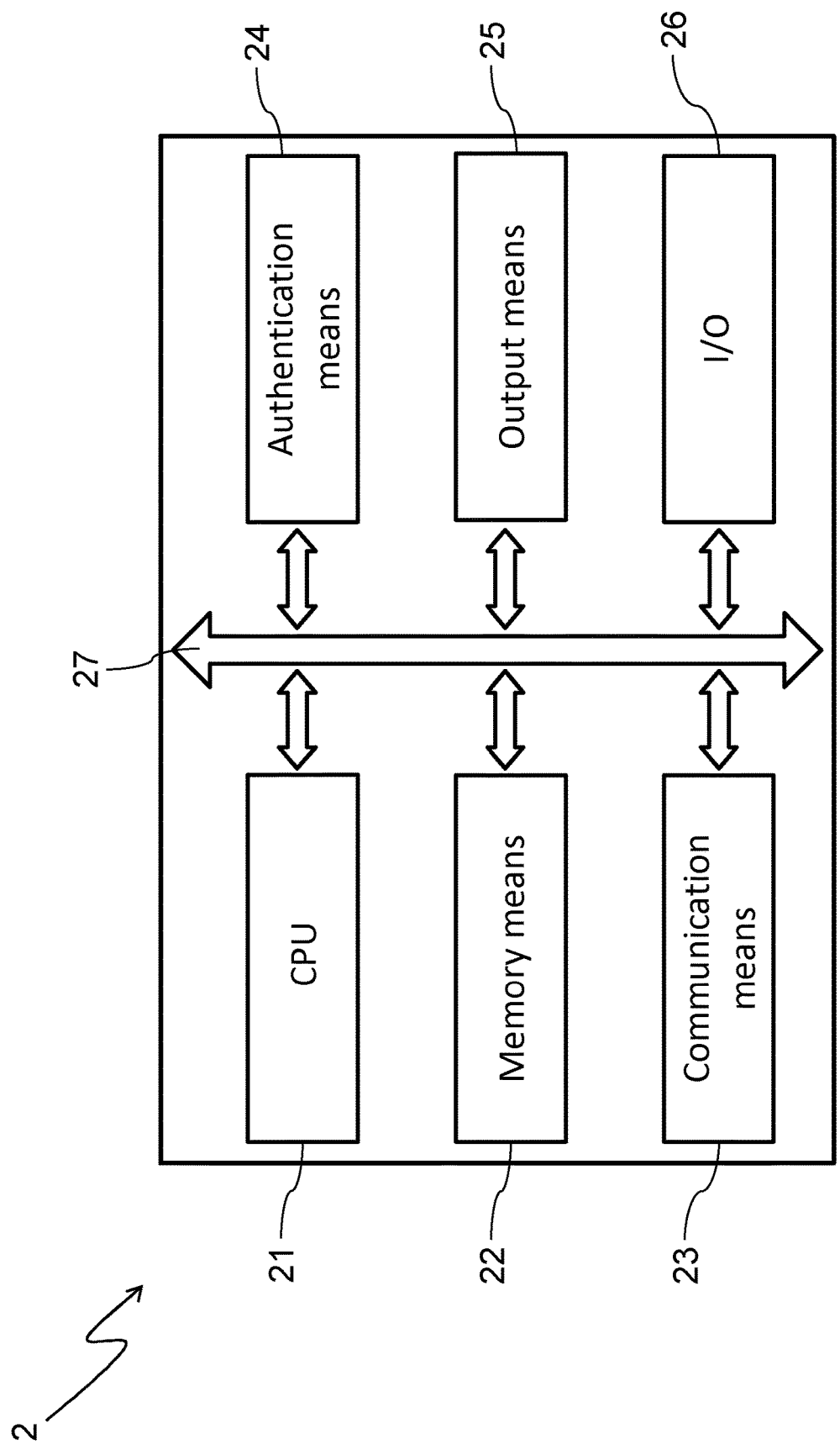
FIG. 1 shows a block diagram of an apparatus (also referred as 'device') according to the present invention.

With reference to FIG. 1, a personal apparatus 2 according to the present invention (e.g. a smartphone, a tablet, a smartwatch, smart-glasses, a notebook, a laptop, a desktop pc, or the like) comprises the following parts:

control and/or processing means 21, like a Central Processing Unit (CPU), an FPGA, a CPLD, a microcontroller, or the like, configured for executing at least the set of instruction implementing the method according to the invention;

memory means 22, adapted to contain at least the data and instructions (comprising the set of instruction implementing the method according to the invention) used by the other elements of the apparatus 1 and, in particular, by the control and/or processing means 11;

communication means 23, preferably one or more network interfaces for a GSM/GPRS/UMTS/LTE network and/or operating in accordance with a standard of the IEEE 802.3 (also known as Ethernet) and/or IEEE 802.11 (also known as WiFi) and/or 802.16 (also known as WiMax) families, which allow the apparatus 1 to communicate with a communication network, preferably a mobile network, or the like;

authentication means 24 apt to detect authentication information specifying at least a first and a second level of access; authentication means 24 may comprise, for example, a computer program validating a password inserted through a touch screen, a fingerprint sensor, a smart-card readed, or the like;

a output means 25 in signal communication with the control and/or processing means 21, and configured for receiving display instructions at its input, which are generated by the control and/or processing means 11, and outputting a video signal, which can, for example, be displayed by a display comprised in said apparatus 2;

input/output (I/O) means 26, which may be used, for example, for connecting said apparatus 2 to peripherals (e.g. an external screen or external mass storage units) or to a programming terminal configured for writing instructions (which the control and/or processing means 21 will have to execute) into the memory means 22; such input/output means 26 may comprise, for example, a USB, Firewire, RS232, IEEE 1284, or WiFi adapters, audio speaker, vibration generator, touch screen or the like;

a communication bus 27, which allows the exchange of information among the control and/or processing means 21, the memory means 22, the communication means 23, the authentication means 24, the output means 15, and the I/O means 16.

As an alternative to using the communication bus 27, the control and/or processing means 21, the memory means 22, the communication means 23, the authentication means 24, the output means 25, and the I/O means 26 can be connected through a star architecture.

The memory means 22 also contain at least a first and a second set of personal information, wherein each set comprises information relating to a particular user of said apparatus 2; for this reason, these information are also referred as personal information. The personal information contained into said memory means 22 may comprise personal messages exchanged with a particular contacts, personal contacts, computer program (i.e. the Apps) allowing access to remote personal information (e.g. social network profiles, foreign bank accounts, or the like), configuration files for configuring the user interface to access to particular applications, and the like. More details about the use of the invention will be provided in the following of this description.

In order to preserve user privacy, the two set of personal information are disjoined. The first set of personal information can be accessed after a first level of authentication (e.g. PIN code insertion, or password login), whereas the second set of personal information, which preferably contains more delicate personal information, can be accessed after second level of authentication (e.g. face recognition, fingerprint recognition, voice recognition, password validation, or the like). The presence of the second level of authentication ensures protection for the users privacy; in fact, if other users do not know the presence of the second level of authentication and/or the existence of a second set of personal information, the occurrence of embarrassing situations is prevented.

When the apparatus 2 is in an operating condition, said apparatus 2 executes instructions that implement the method for preserving the privacy of at least a user, wherein said method comprises the following phases:

an authentication phase, wherein authentication information are detected through the authentication means 24, wherein said authentication information specify a first level of access for allowing the output means 25 accessing to the first set of personal information, and a second level of access for allowing the output means 25 accessing to both the first and the second sets of personal information;

a determination phase, wherein it is determined through the control and/or processing means 21, on the basis of the authentication information detected by the authentication means 24, whether the first or the second level of access is enabled;

a first output phase, wherein said at least one first set of personal information is outputted (i.e. reproduced, played, transmitted), through the output means 25, if either the first level of access or the second level of access is enabled;

a second output phase, wherein said at least one second set of personal information is represented (i.e. reproduced, played, transmitted), through the output means 25, only if the second level of access is enabled.

In this way, it is possible to preserve the privacy of a user when the access to at least one of said set of personal information is restricted.

In other words, the invention-related method is adapted to perform receiving and processing of user inputs, creation of a service for exchanging information including contact details related to potential communication parties, creation of information dependent on said user inputs and preferably receiving and/or transmitting said information to potential communication parties, displaying of said information, and preferably receiving and transmitting information data over a phone or an internet connection. The method is characterized by the fact, that said method is adapted to receive a user command to determine a privacy status (i.e. the level of access), wherein said privacy status relates to a particular communication party or service, said method is adapted to initiate at least one step to ensure said privacy status related to said particular communication party or service and said at least one step influences audio and/or visual representations of information related to said particular communication party or service.

In this way, it is possible to enhance the protection of privacy. This is achieved through the determination of privacy status relating to communication service and parties.

Said receiving of user inputs is preferably performed by means of keyboard, touchpad, touchscreen or any other type of interfaces allowing a user to interact with an electronic device. Said user input may also be an audio command.

Said creation of a service means also the provision of a service through which the user is enabled to use a communication service.

Said creation of personal information dependent on the user inputs means to compose messages via the inputs of the user such as text-based messages, which can in general involve also audio and/or video data. Said creation relates to any kind of information that may be used and be transmitted to another communication party.

The inventive method enables the user to determine a privacy status and said initiation of a step to ensure the privacy status, wherein said step influences the audio and/or visual representation of information related to said particular communication party or service. This leads to the advantageous effect that the user defines freely at which level the privacy status is to be determined. The privacy status may preferably be determined for the visibility of a services such as an app on the electronic device, for the visibility of a communication session such as a chat with a communication party and/or for the visibility of exchanged information such as specific sentences, words, images, videos or the like between the parties. The aforementioned free determination of the privacy status for different levels enhances the protection of privacy enormously.

In accordance to another advantageous aspect of the present invention, it is provided a method adapted to determine said privacy status through providing a security barrier simultaneous or after determination of said privacy status and to provide a possibility to pass said security barrier. Said security barrier is preferably a non-visibility of an information or service, which means that just a specific user, in particular the user to whom said electronic device is assigned or said electronic device belongs, is aware of the existence of said service or said information. Said non-visibility may be also performed by hiding in a specific place such as folder, window, window area or the like. Said passing with regard to the aforementioned non-visibility is preferably knowledge and/or performing of a step to make said service or information visible for said user. In addition said security barrier may be common passwords, sliding patterns, swiftkeys, swypings or in general the usage of any predefined commands/inputs to pass said security barrier.

As already mentioned in the above with regard to said determination of said security status for different levels it is provided a method according to which said security barrier is made for securing an access to said service for exchanging information, to an specific session for exchanging information with said communication parties, or to specific parts of information exchanged with said communication parties. This means that for example a general access or usage of a service such as an app may be restricted by said security barrier such as non-visibility or secured access through authentication via any kind of information such as password, swiftkey, swyping, audio command and/or image recognition or the like to make said service or information available to said user.

Further preferable ways of said influencing of said visual representation is in particular hiding, not displaying, suppression of visual representation of said information, representation of a locked window, representation on a different area of said window, representation of surrogate visual elements, representation of a dummy element or representation as a list comprising communication parties with said privacy status, or the like.

In addition it is preferred to influence said audio representation by suppression of an audio signal related to said information of parties with said privacy status or outputting of surrogate audio signals. It means that signals such as audio and/or vibrations that are outputted normally by receiving or exchanging of information between said parties, for example by sending a message over an app on a mobile device or by sending a message over a social network through a tablet pc or smart phone are suppressed or are influences a mentioned before.

Summarizing, the control and/or processing means 21 of the apparatus 2 may be also configured for performing the following steps:
  generating or receiving a new message (e.g. textual messages and/or signalling messages, such as incoming call notification messages, dialing messages, or the like) through the communication means 22;
  storing said new message in either the first or the second set of messages on the basis of privacy policy information.

Said privacy policy information defines how the users privacy should be preserved.

More in details, the privacy policy information may specify at least a first and a second set of contacts, and wherein the control and/or processing means 21 are configured for performing the following conditional steps:
  storing said new message in the first set of messages if the recipient or sender of said new message is contained in the first set of contacts;
  storing said new message in the second set of messages if the recipient or the sender of said new message is contained in the second set of contacts.

Alternatively or in combination with the above-described technical features, the privacy policy information may comprise the authentication information, and wherein the control and/or processing means (21) are configured for performing the following conditional steps:
  storing said new message in the first set of messages if the first level of access is enabled;
  storing said new message in the second set of messages if the second level of access is enabled.

In this way, the user privacy is preserved because it is possible to control in which set of personal information the new generated messages or incoming messages are stored.

In a further preferred embodiment it is provided a method adapted to modify audio and/or visual representations of communication information related to said particular communication parties depending on the used electronic device. This means that said user is enabled to define different privacy status for different used electronic devices.

According to a further preferred invention-related feature, the apparatus 2 may be configured for passing from the second (or higher) level of access to the first level of access (or a level lower than the former one) after an interval of time, preferably when said user initiate an action which can be recognized as an inactivity of said user in said privacy status. In other words, the control and/or processing means 21 may be configured in particular for selecting the first level of access after that said apparatus 2 has spent a period of time, preferably inactive, during which the second level of access was enabled. This can be performed in particular through automatic closing, locking, leaving, logging out or changing to communications without a privacy status, to the first level of access respectively.

In this way, said user is put into a comfortable position that ensure his/her privacy, even if he/she is not aware of an upcoming access to his/her apparatus 2, because said services and/or information which are determined and affected by said privacy status will be automatically deprived and not be provided or shown to undesirable alien (i.e. other users) that takes control on said apparatus 2.

In accordance to an aspect of the present invention, it is provided a software product comprising a program code for performing a method according to one of the aforementioned methods comprising the above advantageous and invention-related features.

Further it is provided a server implementing at least some parts of methods or software elements for realization of the present invention, which is adapted to perform a method comprising the above advantageous and invention-related features.

With regard to an inventive aspect it is provided an electronic device adapted to perform a method according to one of the aforementioned methods comprising the above advantageous and invention-related features, whereby said electronic device is in particular a notebook, laptop, tablet pc, smart phone, a desktop pc or the like.

Further it is provide an inventive storage medium comprising a software product according to the above mentioned methods and/or above mentioned software variants, whereby said medium is in particular a server, mass storage device, cd, dvd or bluray disc.

Figure 2:
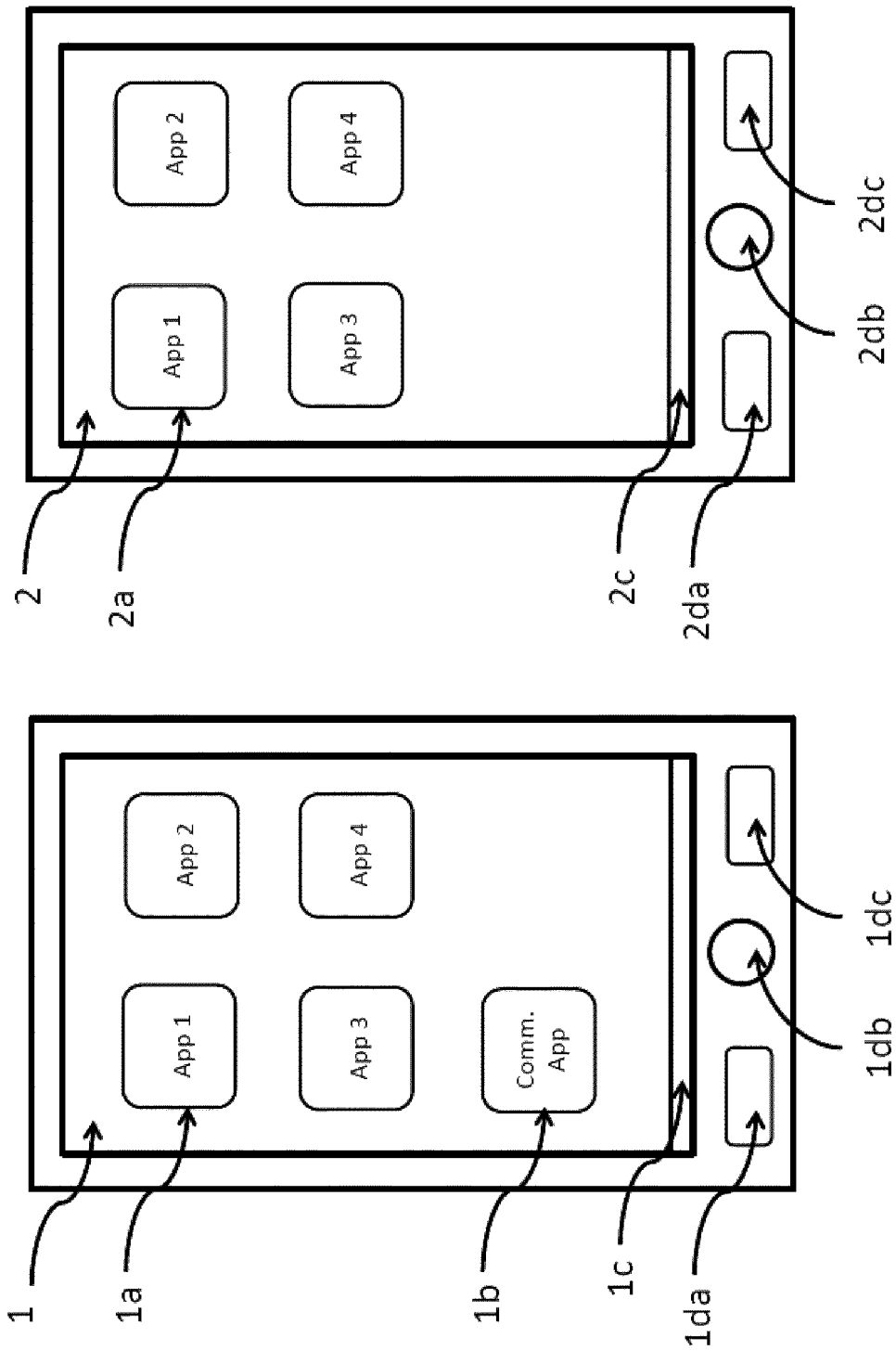
FIG. 2 shows two devices when providing a communication service, wherein the left-most works according to the state of the art and the right-most works according to the present invention.

With also reference to FIG. 2, an electronic device 1, according to the state of the art, comprises a touchscreen display and operating buttons 1da, 1db and 1dc. The touchscreen display comprises also a so-called control center or sliding bar 1c. The electronic device 1A displays a plurality of icons such as 1a labeled as App 1, 1b labeled as App Comm. App and further icons labeled as App 2, App 3 and App 4. These icons can be selected by the user for starting and using of different applications. The icon with the label Comm. App represents a communication application for a communication service (e.g. an online dating service, a home banking service, or the like). The second device 2 is in accordance with the present invention, and comprises comparable elements such as a touchscreen display and operating buttons 2da, 2db and 2dc. The touchscreen display of the apparatus 2 comprises also a so-called control center or sliding bar 2c. The electronic device 2A displays also a plurality of icons such as 2a labeled as App 1 and further icons labeled as App2, App 3 and App 4. The second device 2 according to the present invention does not show the icon comparable to the icon 1b from the device 1. The reason for not displaying of the Comm. App lies in the fact that according to the present invention the visual representation of the communication service provided by Comm. App is influenced, because of the determination of the privacy status for this service. The present invention foresees several ways to determine the privacy status for a service such as determination over the application/service settings, determination over the settings of the electronic device and/or the corresponding operating system of the electronic device. In other words, the first set of personal information P1 may comprise a first set of applications, whereas the second set of personal information may comprises a second set of applications P2; moreover, the output means 25 may be configured for displaying a user interface depicting a first set of icons, wherein each icon contained in said first set identifies one of the applications contained in the first set of applications, and said user interface also depicts a second set of icons when the second level of access is enabled, wherein each icon contained in said second set identifies one of the applications contained in the second set of applications.

In this way, it is possible to preserve users privacy because said user can hide a set of applications.

Furthermore, the present invention provides also several ways to pass the security barrier caused by the determination of said privacy status such as entering a password, selection and/or activation over the control center or over comparable elements adapted to receive commands for example to change into a visible mode of the icon of Comm. App or direct initiation and starting of applications, which are influenced by said determination of the privacy status for example the visibility of the Comm. App. In addition the present invention foresees also the possibility to use predefined audio commands to pass the security barrier and to invoke services or information, which have the privacy status and to start, use or in general provide those services or information to the user.

Figure 3:
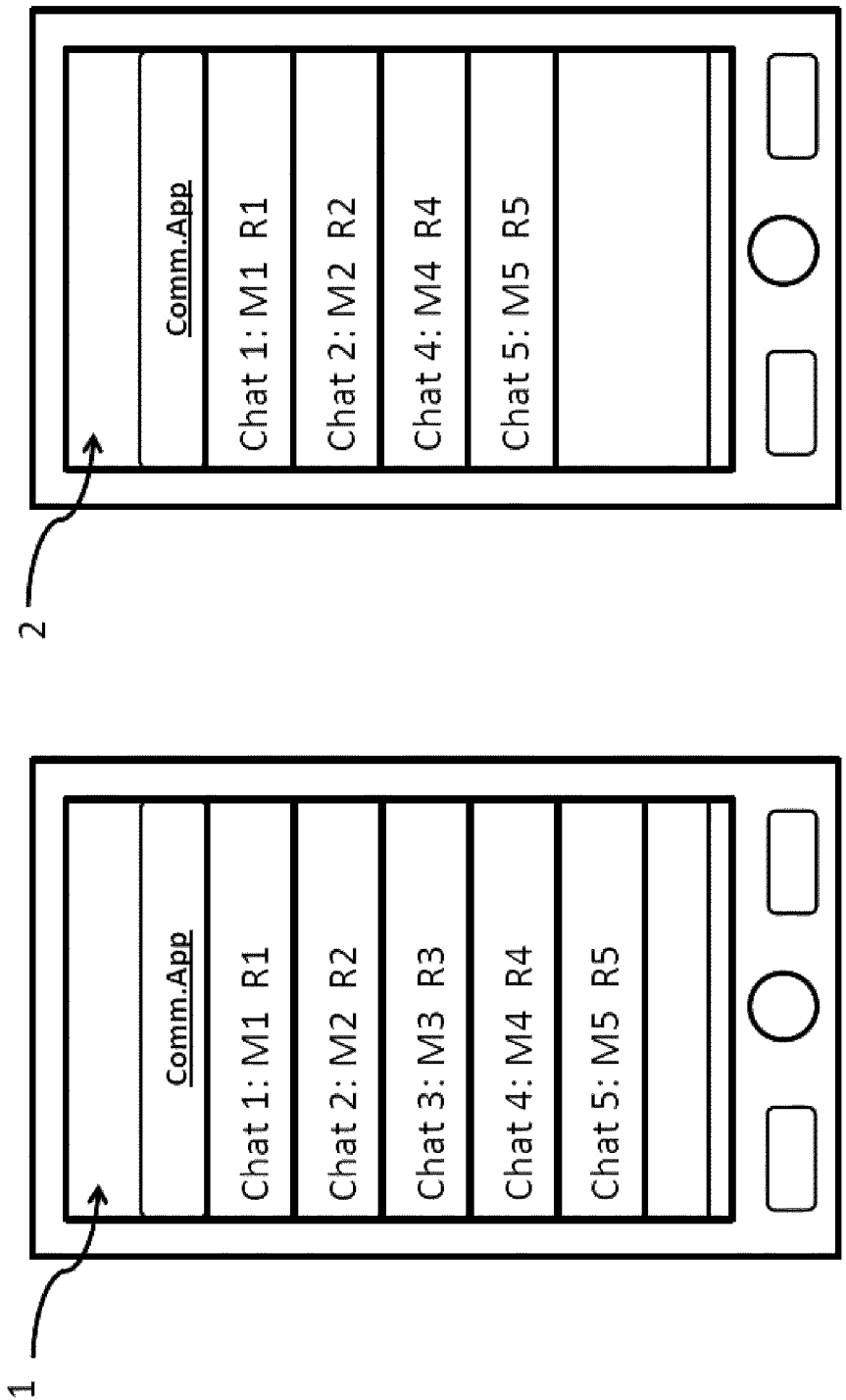
FIG. 3 shows the two devices of FIG. 2, while using a communication service comprising a plurality of different chats between a user of the devices and other communication parties.

With also reference to FIG. 3, the touch screen display of each of the devices 1 and 2 shows exemplarily the service Comm. App in a operating condition, namely when a window comprising a plurality of different chats is displayed. The device 1 displays Chat 1, Chat 2, Chat 3, Chat 4 and Chat 5 but the device 2 according to the present invention displays only Chat 1, Chat 2, Chat 4 and Chat 5 and Chat 3 is not displayed. The reason for the invisibility of Chat 3 is similar to the invisibility of the icon Comm. App: the determination of the privacy status for Chat 3 and the insertion of the security barrier produce the hiding of Chat 3. In this way a user having access to the electronic device 2 with or without the password for unlocking said device or a user having access to said device because a password protection for said device is deactivated will not be able to see Chat 3, because of having said privacy status and said security barrier making Chat 3 invisible to users other than the original one.

Figure 4:
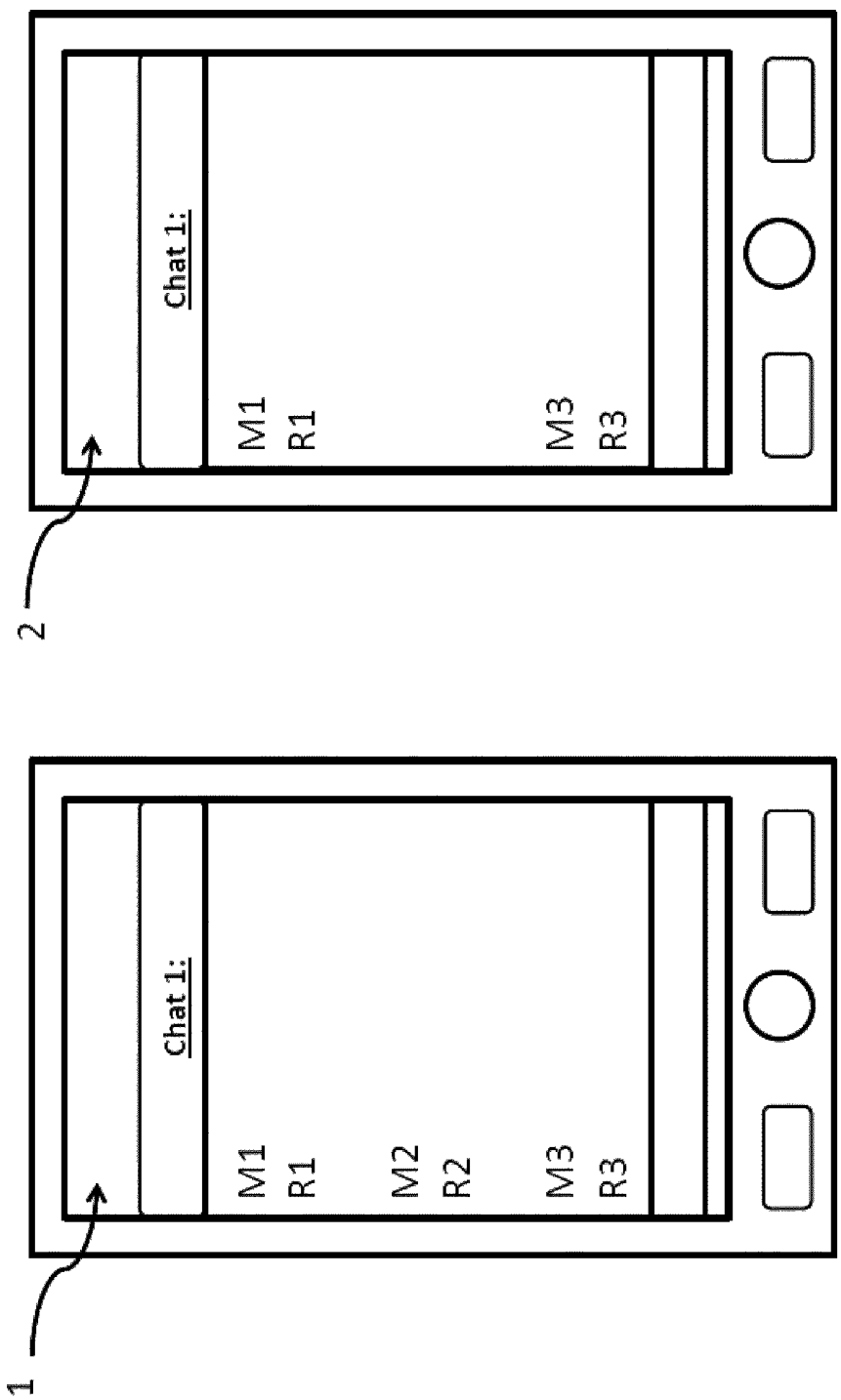
FIG. 4 shows the two devices of FIG. 2, while performing a chat between a user of a communication service and a communication party, whereby said aforementioned chat comprises different information such as messages.

With also reference to FIG. 4, the touchscreen display of each of the devices 1 and 2 shows a chat history of the user of said devices 1 and 2 and respective communication parties. The transmitted messages to other parties are M1, M2 and M3 and the received messages are R1, R2 and R3. The device 2 according to the present invention does not show the messages M2 and R2, because the determination of the privacy status for these messages. In this way and according to the present invention, it is possible to determine single messages such as M2 and R2 as private and to make those invisible. It is clear that each single message, information, image, video or the like can be the subject of said inventive privacy status, for example just M2 or R2. Therefore an undesired user having access to this chat is not able to see messages with said privacy status. It is to be noted the gap in FIG. 4 between R1 and M3 is just for the sake of clarity, that M2 and R2 are not visible anymore, so that the real implementation according to the invention will foresee an unbroken (continuous) listing between R1 and M3.

Figure 5:
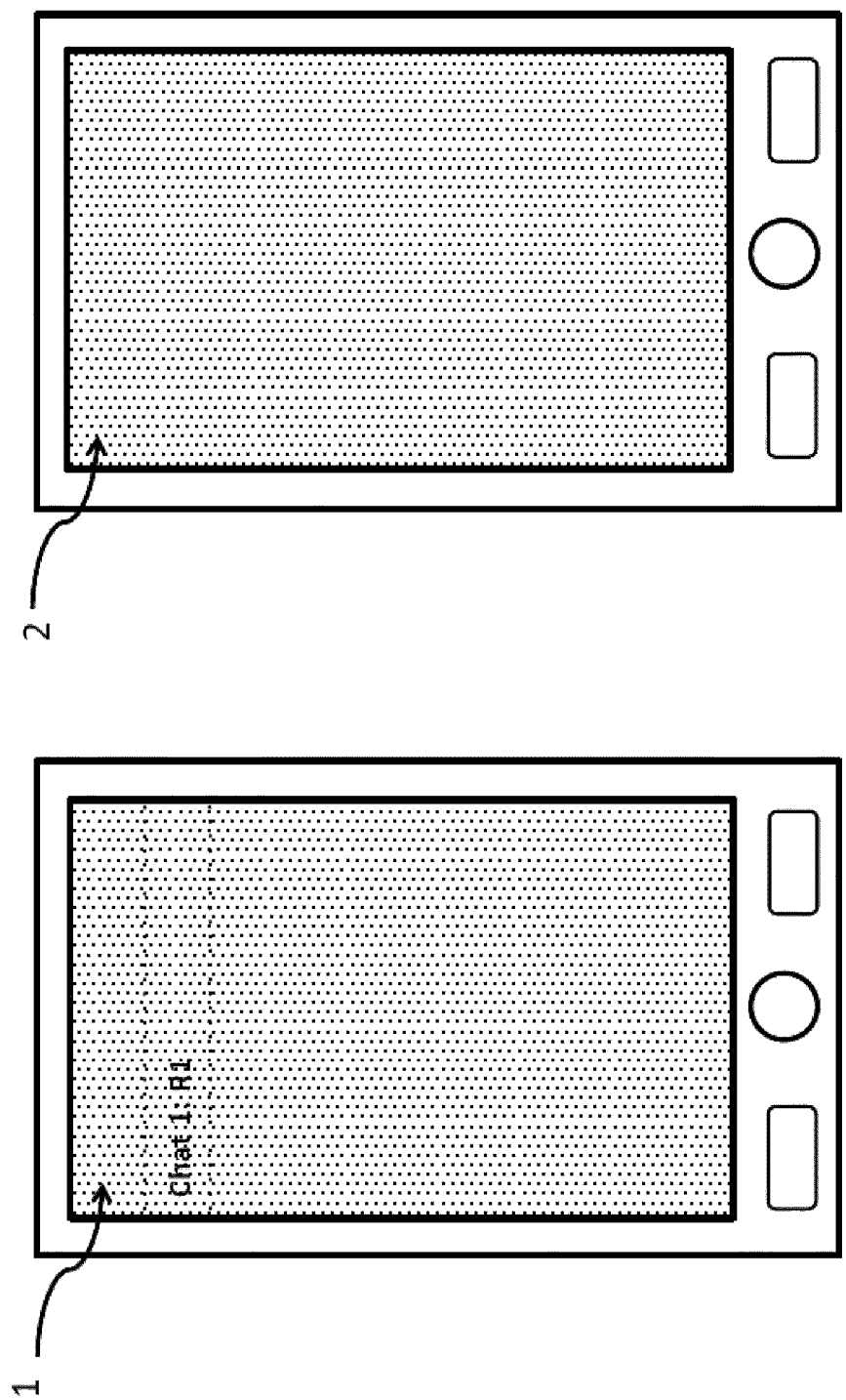
FIG. 5 shows the two devices of FIG. 2, while receiving information from a communication party.

With also reference to FIG. 5, it will now be described the reception of a message R1 from a communication party over Chat1. According to the state of the art, said device 1 displays the received message R1 and shows also the sender of the message R1 at the same place as Chat 1 is displayed which normally is used for labeling the displayed message by using the name of the sender. The electronic device 2 according to the invention will not display the sender or Chat 1 and will not display the message R1, because of determination of said privacy status for the sender respectively said communication party. In this way, the visual representation of said communication is suppressed. The invention foresees also the suppression of an audio signal by receiving a message or outputting a different audio signal which is typically not used for messages.

In other words, the output means 25 are adapted to output an audio and/or signal, and wherein said control and/or processing means 21 are configured for reproducing and/or displaying, through said output means 25, at least an audio and/or visual notification when a message is received and only if said message is stored in the first set of messages and/or the second level of access is enabled.

As a consequence said device 2 can remain silent by suppressing visual and/or audio signals. The undesirable user and/or observer cannot see and/or even recognize that a message was received by said device 2 thus the users privacy is protected by the present invention.

Figure 6:
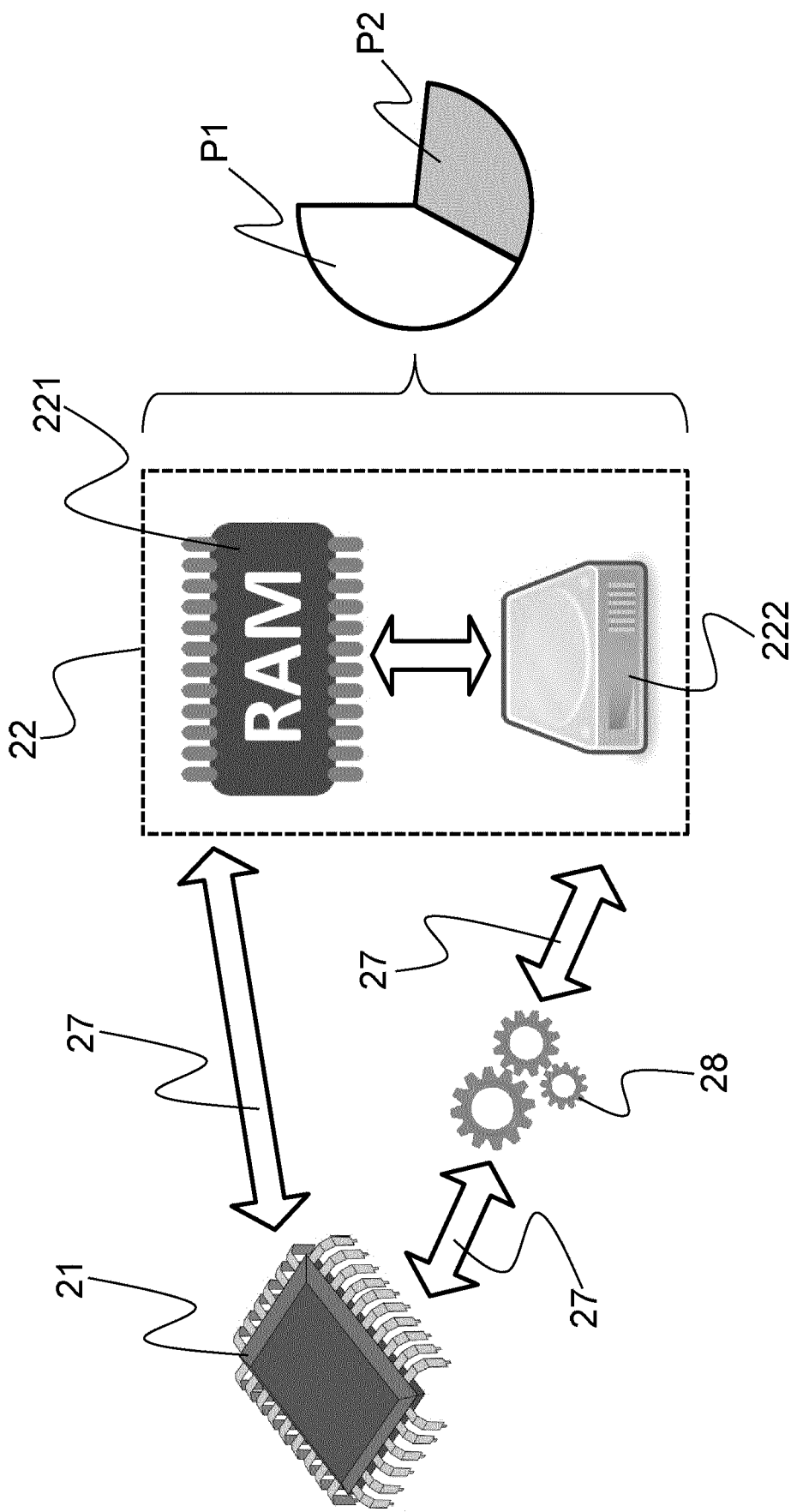
FIG. 6 shows a graphical representation depicting the interactions between the different elements of the apparatus shown in FIG. 1.

With also reference to FIG. 6, a further technical feature for preserving user's privacy will now be described. More in details, the apparatus 2 may also comprise encryption means 28 configured for encrypting/decrypting data passing through them, in particular the data contained in the second set of information P2, wherein said encryption means 28 are in signal communication, preferably through the communication bus 27, with the control and/or processing means 21 and the memory means 22. The encryption means 28 may be a set of instructions implementing one or more encryption/decryption algorithm according to the state of the art (e.g. DES, Triple DES, Blowfish, Twofish, AES, TEA, IDEA, or the like) and/or at least a dedicated hardware component implementing one or more of said algorithm. The memory means 22 may contain both the first set of personal information P1 and the second set of personal information P2, wherein said second set P2 is accessed through the encryption means 28 when the second level of access has been enabled by the user through the authentication means 24. In other words, the second set of personal information P2 is stored in the memory means 22 in an encrypted format. In this way, the users privacy can be better preserved, because it is not possible to read the second set of instruction by simply accessing the memory means 22, e.g. by means of a personal computer connected through the I/O means 26.

The memory means 22 are preferably designed to implement the well-known virtual memory management technique, so they comprise at least a Random Access Memory (RAM) module 221 and a mass storage device 222 (e.g. a solid state memory module, a hard disk, or the like). This configuration is particular vulnerable when the apparatus 2 is in an operating condition, because at least part of the second set of personal data may be stored in the memory means in a decrypted format, by making possible to access them through spyware software or any other accessing technique. It is evidenced that this problem can be solved by realizing the encryption means 28 by means of dedicated hardware components, since the personal information will travel in a decrypted format only on the communication bus 27, which may be difficult to spoof for several well-known reasons, e.g. the channel bandwidth is very large and the information travel in a highly fragmented format by making difficult to reconstruct the entire set of personal information. In other words, the apparatus 2 may comprise the encryption means 28 that are in signal communication with the control and/or processing means 21 and the memory means 22, and configured for performing the following tasks:

encrypting at least a first set of data that the control and/or processing means 21 write in the second set of personal information P2;

decrypting at least a second set of data that at least the control and/or processing means 21 read from the second set of personal information P2.

In this way, the protection of the users privacy can be improved.

All the phases according to the method of the present invention may be performed by a mobile apparatus (e.g. a mobile phone, a smartphone, a tablet, a wearable device such as a smartwatch, smart-glasses, or the like) according to the state of art. Said mobile apparatus is configured for executing a software implementing all the phases of the method according to the invention; the set of instructions of said software can be stored into the memory of said terminal by the manufacturer, or can be downloaded from a server via a communication network (e.g. by downloading through the Internet an application from an online shop, such as Google Play©, App Store, or the like) and then stored/installed in the memory of said mobile apparatus.

In addition it has to be appreciated that the present invention will enhance the protection of the privacy of users while communicating with others. Therefore the present invention can be implemented to communication application, such as those used commonly on smart phones, tablets or the like. In addition the proposals in accordance with the present invention can be used for the implementation of social network softwares, which are commonly installed on smart phones, tablets, PCs or which are installed on servers to perform interactions with different communication parties having communication sessions with servers. The present inventions is also meant to be used for applications (Apps), which are installable on electronic devices while the applications are meant to work with the electronic device as such and also to work with the operating system of the electronic device to perform one of the methods in accordance to the present invention.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A method for communication of an electronic device, said method comprising:
   receiving and processing user inputs,
   creating a service for exchanging information including contact details related to potential communication parties,
   creating information dependent on said user inputs,
   receiving and/or transmitting said information to potential communication parties,
   displaying said information,
   receiving and transmitting information data over a phone or an internet connection,
   receiving a user command to determine a privacy status, wherein said privacy status relates to a particular communication party or service,
   initiating at least one step to ensure said privacy status related to said particular communication party or service,
   said at least one step influencing audio and/or visual representations of information related to said particular communication party or service,
   configuring a first set of personal information and a second set of personal information to be output via an output means, wherein the first set of personal information comprises a first set of applications and the second set of personal information comprises a second set of applications, and
   wherein the method further comprises:
      an authentication phase, wherein authentication information is detected through an authentication means, wherein said authentication information specify:
         a first level of access for allowing the output means to access the first set of personal information; and a second level of access for allowing the output means to access both the first set of personal information and the second set of personal information;

a determination phase by a control and/or processing means, wherein it is determined, on a basis of the authentication information detected by the authentication means, whether the first or the second level of access is enabled;

a first output phase, wherein said first set of personal information is outputted through the output means if either the first level of access or the second level of access is enabled; and a second output phase, wherein said second set of personal information is outputted through the output means only if the second level of access is enabled, so that a privacy of a user of the electronic device is preserved when the access to said second set of personal information is restricted;

wherein the method further comprises:
receiving private data via a service that is subject to control by the second level of access, wherein the private data is not accessible by the service when the first level of access is active; and after receiving the private data via the service and while the electronic device is operating in a mode where only the first level of access is operable, causing the electronic device to output a notification signal to alert a user regarding receipt of the private data, wherein the notification signal is a surrogate signal, and wherein, as a result of being a surrogate, the surrogate signal is different than a signal that would otherwise be outputted if the electronic device were operating in a mode where the second level of access was operable.

2. The method according to claim 1, further comprising determining said privacy status through providing a security barrier simultaneous or after determination of said privacy status and to provide a possibility to pass said security barrier.

3. The method according to claim 2, wherein said security barrier is made for securing an access to said service for exchanging information, to a specific session for exchanging information with said communication parties, or to specific parts of information exchanged with said communication parties.

4. The method according to claim 2, wherein said security barrier is passable by means of password, swiftkey, swyping, audio command and/or image recognition.

5. The method according to claim 1, wherein said indication that is displayed on the electronic device is one of: a representation of a locked window, a representation on a different area of said window, a representation of surrogate visual elements, a representation of a dummy element, or a representation of a list comprising communication parties with said privacy status or encrypting.

6. The method according to claim 1, wherein said influencing of said audio representation is a suppression of an audio signal related to said information of parties with said privacy status or outputting of surrogate audio signals.

7. The method according to claim 1, further comprising modifying audio and/or visual representations of communication information related to said particular communication parties depending on the used electronic device.

8. The method according to claim 1, wherein said method is adapted to automatically close, lock, leave, log out or change to communications without said privacy status, when said user initiate an action which can be recognized as an inactivity of said user in said privacy status and/or after a period of time.

9. A computer program product comprising:
a tangible memory device adapted for storing non-transitory computer code instructions; and
non-transitory computer code instructions saved on said tangible memory device, wherein said non-transitory computer code instructions, when executed on a processor, execute the steps of the method according to claim 1.

10. A server adapted to perform a method according to claim 1.

11. A storage medium comprising the computer program product according to claim 9, whereby said medium is a server, mass storage device, cd, dvd, usb or bluray disc.

12. An electronic device for preserving privacy a user, comprising:
memory means adapted to store a first set of personal information,
output means which can output said first set of personal information, and
control and/or processing means in communication with said memory means and said output means,
wherein
said memory means also store a second set of personal information, and wherein said electronic device also comprises:
authentication means adapted to detect authentication information specifying:
a first level of access for allowing the output means to access the first set of personal information,
a second level of access for allowing the output means to access both the first and second sets of personal information,
wherein the first set of personal information comprises a first set of applications and the second set of personal information comprises a second set of applications, and
wherein the control and/or processing means are configured for:
reading the authentication information determined by the authentication means,
determining, on a basis of said authentication information, whether the first or the second level of access is enabled,
outputting, through the output means, said first set of personal information, if either the first level of access or the second level of access is enabled, and
outputting, through the output means, said second set of personal information only if the second level of access is enabled,
so that the privacy of the user is preserved when the access to said second set of personal information is restricted;
wherein the control and/or processing means are further configured to:
receive private data via a service that is subject to control by the second level of access, wherein the private data is not accessible by the service when the first level of access is active; and
after receiving the private data via the service and while the electronic device is operating in a mode where only the first level of access is operable, cause the electronic device to output a notification signal to alert a user regarding receipt of the private data, wherein the notification signal is a surrogate signal, and wherein, as a result of being a surrogate, the surrogate signal is different than a signal that would otherwise be outputted if the electronic device were operating in a mode where the second level of access was operable.

13. The electronic device according to claim 12, wherein messages exchanged with the electronic device are textual messages and/or signaling messages, including incoming call notification messages, and/or dialing messages.

* * * * *